ADJUSTABLE FREQUENCY OSCILLATOR SYSTEM

Filed March 28, 1951 5 Sheets-Sheet 1

INVENTOR
B. M. WOJCIECHOWSKI
BY W. C. Parnell
ATTORNEY

INVENTOR
B. M. WOJCIECHOWSKI
BY W. C. Parnell
ATTORNEY

May 15, 1956 B. M. WOJCIECHOWSKI 2,745,962

ADJUSTABLE FREQUENCY OSCILLATOR SYSTEM

Filed March 28, 1951 5 Sheets-Sheet 3

INVENTOR
B. M. WOJCIECHOWSKI
BY W. C. Parnell
ATTORNEY

INVENTOR
B.M. WOJCIECHOWSKI
BY W. A. Parnell
ATTORNEY

ADJUSTABLE FREQUENCY OSCILLATOR SYSTEM

Filed March 28, 1951 5 Sheets-Sheet 5

INVENTOR
B.M.WOJCIECHOWSKI
BY W.C. Parnell
ATTORNEY 2,745,962

ADJUSTABLE FREQUENCY OSCILLATOR SYSTEM

Bogumil M. Wojciechowski, New York, N. Y., assignor to Western Electric Company, Incorporated, New York, N. Y., a corporation of New York Application March 28, 1951, Serial No. 217,977

12 Claims. (Cl. 250—36)

This invention relates to decade oscillator systems for generating signals of any desired frequency.

Many types of measuring apparatus require for their operation signal sources adjustable over a wide range of frequency. The frequency accuracy of these sources is becoming of increasing importance with the increasing degree of precision of measurement required. Such signal sources are need, not only for physical and electrical measurements in laboratories, but also for the production testing of various products such, for example, as piezo-electric crystals for communication equipment.

It is relatively easy to obtain frequency accuracy in a fixed frequency oscillator and some of the commercially available oscillators of this type are accurate to one part in $10^8$ per day whereas the best available adjustable frequency oscillators are accurate to only about one part in $10^5$ over a much shorter period. The inaccuracies incident to the use of these adjustable oscillators are due in part to their lower degree of frequency stability and in part to the errors involved in adjusting the frequency and reading the frequency scale.

Fixed frequency oscillators can be stabilized by mechanical resonators such as quartz crystal plates but such means are impracticable where the frequency must be continuously adjustable over a wide frequency range. Frequency determining circuits capable of being tuned over a wide range are inherently more complex and have a lower Q than fixed frequency circuits and their use therefore involves a correspondingly lower degree of frequency stability. Moreover as the frequency range of an oscillator is increased it becomes more difficult to adjust the tuning or to read a frequency scale of reasonable size to the required degree of accuracy.

It has been proposed heretofore to obtain signals of adjustable frequency by selecting and combining harmonics of an available, highly stabilized, standard frequency signal source but prior apparatus of this type has been inherently very expensive and complicated, largely due to the fact that it requires a large number of filters, many of which must be adjustable.

It is the object of this invention to generate stable signals of any desired frequency in a very wide range with relatively inexpensive apparatus.

Further objects of the invention are to indicate directly and accurately the frequency being generated and to generate such signals with low distortion content.

Broadly, the invention comprises a frequency generating, selecting and combining system including a plurality of decade chains, each having three serially-connected modulators with a filter of fixed transmission characteristic in the output of each modulator. The first modulator of each chain is supplied with harmonics of a single fixed standard frequency, all of these frequencies being related to each other on an ascending decimal basis so that, for example, 1 kc., 10 kc. and 100 kc. signals are supplied to the first three chains respectively and all the standard frequencies are preferably harmonics of the same accurate stable standard. The first and third modulators of each chain are also supplied with a signal from a source such as an adjustable oscillator which may be conditioned to generate any one of a plurality of fixed frequencies, predetermined according to the requirements of the system explained in detail below. In the following discussion the expression frequency generating is used for the sake of brevity to include, in some cases, both frequency selection and combining.

In the first or lowest decade the second modulator is supplied with the output of a conventional interpolation oscillator which may be set with high accuracy to any frequency within the relatively narrow band of one decade step interval to provide in the system output the lower order digits of the desired frequency. In each of the higher decades the second modulator receives the output of the next lower decade chain so that each chain becomes the interpolation frequency source for the next higher chain and the output frequencies of the several chains are effectively added together to produce the system output frequency.

The selecting oscillators operate at relatively much higher frequencies than the interpolation oscillator of the first chain and accordingly they are subject to much greater frequency variation in terms of cycles per second. In this system, however, the output of each of these oscillators, which is subject to frequency drift, is used in two modulating operations in which the filters following the modulators are designed to suppress the modulation products subject to drift so that they cannot affect the accuracy of the final frequency.

In building up a system of the general type described, assigning only one frequency to each decade step, it is found that whenever the lower limit of the frequency range to be generated is numerically less than the lowest frequency step of the highest decade, there will be frequency gaps in the range over which the system is intended to be continuously adjustable. According to a further feature of this invention, these gaps are eliminated to provide continuous adjustability in a straightforward manner by controlling the frequencies of the outputs of certain of the decade chains according to the selected positions of both the decade under consideration and also the other decades. This preferably is accomplished by providing for the selective generation within the decade itself of alternative frequencies on certain decade steps. For example, the frequency determining circuit of the selecting oscillator may include two groups of frequency determining elements with switching circuits established by the decade switches to connect in the proper group and element in the group to generate the frequency required in each case. Alternatively, if desired, the additional alternative frequencies required may be provided externally of the decade chain by a fourth modulator and fixed filter together with the necessary switching facilities which are operated automatically when the decade switches are moved to selected positions. In either case, however, any desired frequency is obtanied in a simple, straightforward manner merely by setting the several decade switches and the dial of the interpolation oscillator.

In the decade chains referred to above, the standard frequencies required in each decade are selected by assigning to the selecting oscillator in each of its adjusted positions a particular frequency which, combined with a given one of the many harmonics supplied to the first modulator, gives a single frequency which is constant for all settings of the selecting oscillator thereby permitting the effective isolation of any required one of the harmonics by means of a single fixed narrow pass-band filter. With this accomplished it becomes possible to select the desired products of subsequent modulating operations by means of one fixed filter in each case. An important advantage of this invention therefore is that by means of a three-step modulation procedure and successive selection of the modulation products in each decade chain, any frequency within the range of the system can be obtained without the use of any adjustable filters and with only three fixed filters per decade.

These and other features of the invention will be better understood from the following theoretical discussion and description of the specific embodiments shown in the drawing in which.

Figures 1, 3:
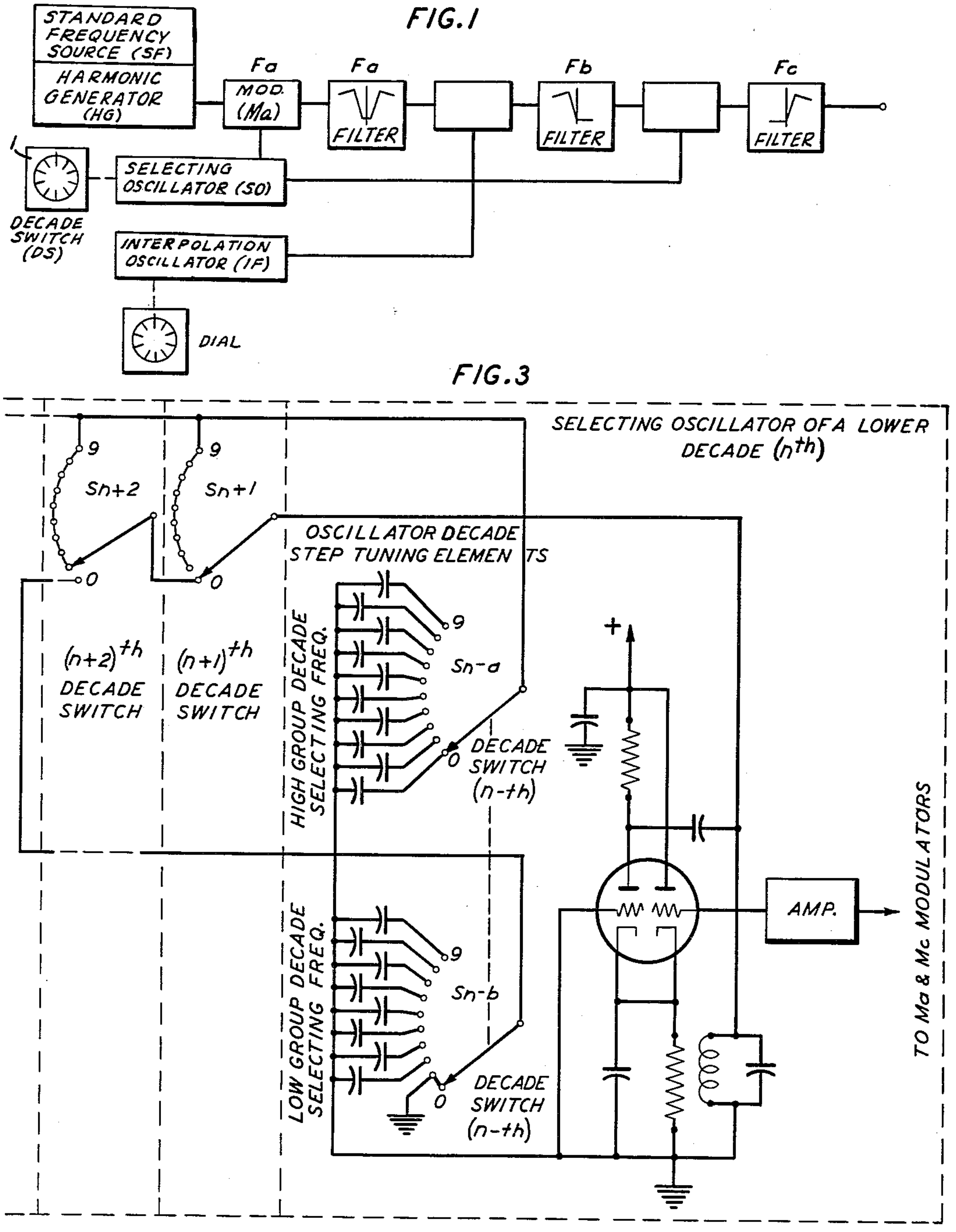
Fig. 1 is a block schematic of a single decade frequency generating system according to the invention.
Fig. 3 is a schematic circuit of a selecting oscillator with means for generating alternative frequencies on the same decade step.

One of the decade chains of an oscillator system, according to this invention, is shown in Fig. 1. The source of standard frequency SF may be a local oscillator locked in with a stabilized standard frequency of the required accuracy and supplying a frequency $fs$ to a harmonic generator HG. The latter may be of any suitable type such as that described in Bell System Technical Journal for October 1937, page 437, which makes available at its output a wide range of harmonics of the frequency $fs$. These harmonics all pass to modulator M*a* which also receives the output of a selecting oscillator SO which may be adjusted by a decade switch DS to generate any of ten suitable frequencies different from each other by a constant frequency interval.

The filter F*a* in the output of the modulator is designed to pass essentially only a single modulation product of suitable frequency which is numerically equal, for example, to the sum of any one of the ten selector oscillator frequencies and a desired one of the harmonics of the standard frequency. It should be noted that the frequency of the selecting oscillator may drift by a certain amount $df$ so that:

$$f_{so(act)}=f_{so}\pm df \qquad (1)$$

where:

$f_{so(act)}$—instantaneous value of frequency of the selecting oscillator $f_{so}$—nominal value of the frequency selecting oscillator Obviously, the same amount of drift will be present in the desired sum of frequencies passing through the first filter (F*a*). Therefore, the pass-band of this filter should be made sufficiently wide to accommodate the anticipated maximum drift ($\pm df$) of the selecting oscillator (SO).

In the discussion immediately following it is assumed that the modulation products desired at the outputs of the first and second filters are in each case the sums of the input frequencies.

The frequency of the signal passing through the first filter (F*a*) can be expressed as:

$$f_a=f_{so}+nf_s\pm df \qquad (2)$$

where:

$nf_s$ is the "*n*th" harmonic of the standard frequency ($f_s$), the value of "*n*" being determined by the selecting oscillator frequency ($f_{so}$) and the midband frequency ($f_a$) of the first filter (F*a*).

Disregarding drift, Equation 2 may be written:

$$f_{so}=f_a-nf_s \qquad (3)$$

From this formula the values of selecting oscillator frequencies for the decade step can be found.

The modulator M*b* receives on one side the constant frequency signal from the filter $f_a$ and on the other side, a signal ($f_{IF}$) from a variable interpolation oscillator IF and representing the lower digits of the desired frequency. The desired modulation product, the sum in this case, is:

$$f_b=f_a+f_{IF} \qquad (4)$$

where:

$f_a$—frequency as defined in Equation 2

$f_{IF}$—frequency of the step interpolation source

An essentially high-pass filter (F*b*) is connected to the output of the second modulator (M*b*). The cut-off frequency of this filter ($f_{b(co)}$) is determined by the minimum value, as given by Equation 3, after substituting into it the lowest value of the step interpolating frequency ($f_{IF(min.)}$). Disregarding drift ($df$) of the selecting oscillator:

$$f_{b(co)}=f_a+f_{IF(min.)} \qquad (5)$$

Incidentally it may be noted that the highest frequency which has to pass the second filter (F*b*) is:

$$f_{b(max.)}=f_a+f_{IF(max.)}$$

Or, since:

$$f_{IF(max.)}=f_{IF(min.)}+f_s$$

then:

$$f_{b(max.)}=f_{b(co)}+f_s$$

Although it is not essential, the second filter ($f_b$) therefore may be a band pass filter, having the bandwidth equal to a single decade step ($f_s$).

The output from the second filter (F*b*) is fed into the third modulator (M*c*), together with part of the output from the selecting oscillator (SO). In this case the desired modulation product is the difference between two input frequencies, or:

$$f_c=f_b-f_{so} \qquad (6)$$

By substituting Equation 2 into Formula 3, and by introducing Equation 1 into Equation 6, we eventually obtain:

$$f_c=nf_s+f_{IF} \qquad (7)$$

From this equation it is evident that the fundamental output frequency from the third modulator is equal to the sum of a desired "*n*th" harmonic of the standard frequency ($f_s$) and of the decade step interval frequency connected to the decade chain. It will also be noted that the selecting oscillator frequency is not present in this fundamental output signal and hence the random variations of the selecting oscillator do not affect the fundamental output frequency.

Since the output product from the third modulator (M*c*) is the difference of two frequencies, as shown in Equation 6, the filter (F*c*), connected to this modulator, should be a low-pass filter with a cut-off frequency equal to:

$$f_{c(co)}=f_{Fb(max.)}-f_{so(min.)}$$

Or, using Equation 7:

$$f_{c(co)}=n(max.)f_s+f_{IF(max.)} \qquad (8)$$

which is the highest output frequency desired from the decade chain, or:

$$f_{c(co)}=f_{D(max.)} \qquad (9)$$

The lowest frequency which passes the third filter (F*c*) is:

$$f_{c(min.)}=n(min.)f_s+_{IF(min.)} \qquad (10)$$

which is the lowest output frequency desired from the decade chain, or:

$$f_{c(min.)}=f_{d(min.)} \qquad (11)$$

Thus, when desired, the third filter (F*c*) also can be of the band-pass type.

From the Equations 8 and 9 it can be found that the highest required harmonic of the standard frequency ($f_s$) is:

$$N(max.)f_s=f_{d(max.)}-f_{IF(max.)} \qquad (12)$$

and the lowest required harmonic is:

$$N(min.)f_s=f_{a(min.)}-f_{IF(min.)} \quad (13)$$

As already stated, the above equations were derived on the assumption that the output component selected from the output of the first and second modulators is the sum component in each case. When this is so the component selected from the output of the third modulator must be the difference component. It can be shown, however, that the operation of the system is fundamentally the same when any one of five other possible combinations of frequency addition or subtraction are used in the particular modulations processes. A summary of all these combinations is given in the following table:

| Case No. | Output of Modulator— | | Output of Modulator Mc must be— | Filter must be— | | Applicable Design Formulae |
|---|---|---|---|---|---|---|
| | Ma | Mb | | Fb | Fc | |
| 1 | SUM | SUM | Diff. | H. P. | L. P. | 3; 5; 9; 12; 13 |
| 2 | SUM | Diff. | Diff. | L. P. | L. P. | 3; 5a; 9; 12a; 13a |
| 3 | Diff. ($f_{so}<nf_s$) | SUM | SUM | H. P. | H. P. | 3; 5; 9a; 12; 13 |
| 4 | Diff. ($f_{so}<nf_s$) | Diff. | SUM | L. P. | H. P. | 3; 5a; 9a; 12a; 13a |
| 5 | Diff. ($f_{so}>nf_s$) | SUM | Diff. | H. P. | L. P. | 3a; 5; 9; 12; 13 |
| 6 | Diff. ($f_{so}>nf_s$) | Diff. | Diff. | L. P. | L. P. | 3a; 5a; 9; 12; 13 |

Where, (3a): $f_{so}=f_a+n_{fs}$ (compare Formula 3)
(5a): $f_{b(co)}=f_a-f_{IF\ min.}$ (compare Formula 5)
(9a): $f_{c(co)}=f_{a\ max.}$ (compare Formula 9)
(12a): $n$ max. $f_s=f_{a\ max.}+f_{IF}$ (Compare Formula 12)
(13a): $n$ min. $f_s=f_{a\ min.}+f_{IF\ max.}$ (compare Formula (13)

The above formulae and the table provide the information necessary for designing decade systems, as described, using the design data most convenient for the particular case. The examples given later in this description all use combination No. 1 from the above table.

It has been shown that this first decade chain provides a means for generating any frequency which may be expressed as the sum of a selected standard frequency harmonic and any frequency within the range of the interpolating oscillator.

Two or more of these decade chains can be combined into a decade oscillator system covering any desired frequency range. In order to make such a system a direct reading decade frequency system, certain rules concerning the decade chain frequencies have to be observed. These rules and the system as a whole will be more readily understood by considering first a simplified multi-decade oscillator system wherein to each decade step there is assigned a single decade chain output frequency which is independent of the other decade positions. Such a simplification is possible when the lowest frequency of the desired continuously adjustable range is at least equal to the frequency of the first step of the highest decade.

Figure 2:
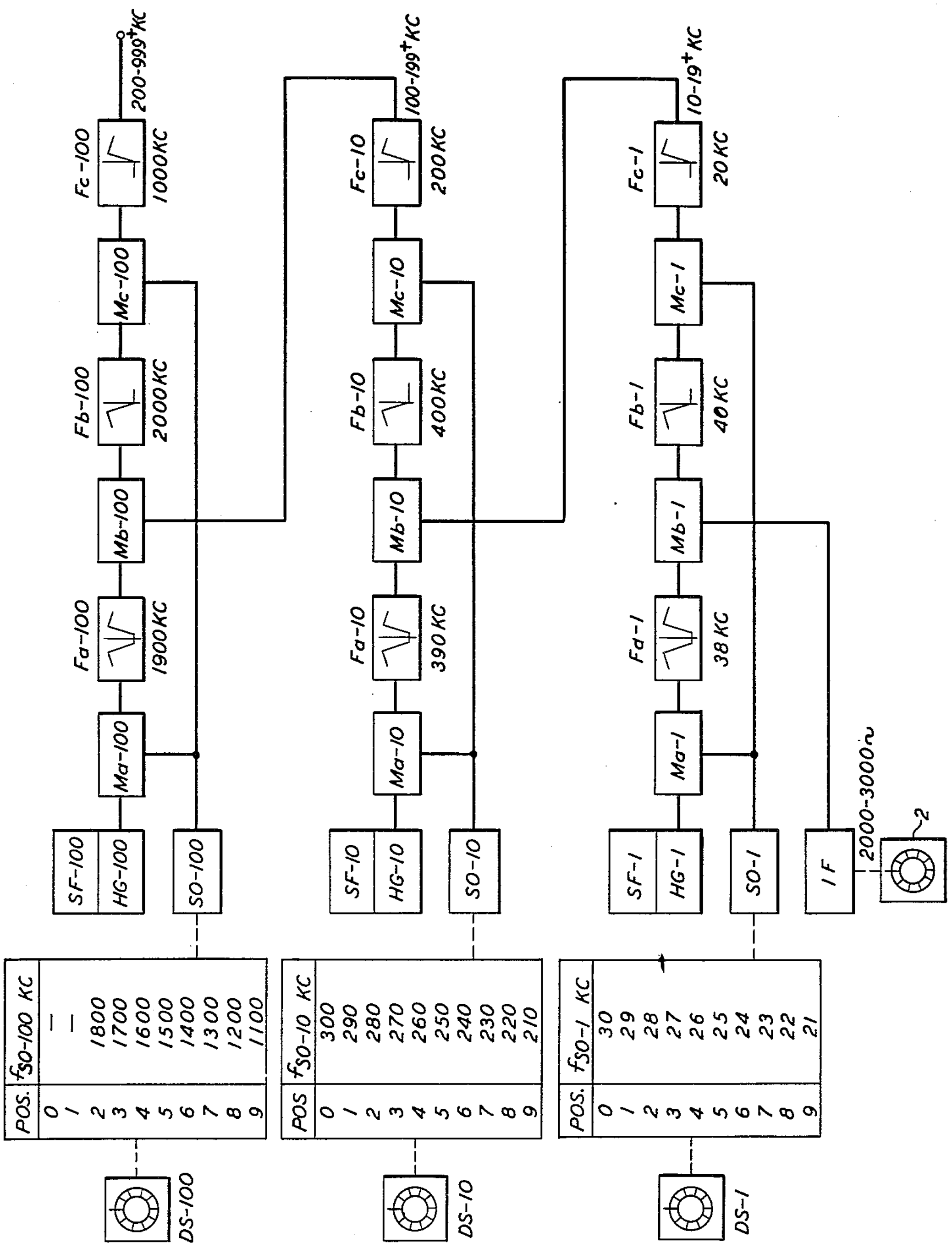
Fig. 2 is a block schematic of a simplified three decade system.

A block diagram of such a system, covering a frequency range from 200 to 1000 kc. is three decades (units, ten and hundreds of kc.) is shown on Fig. 2. It uses an interpolating oscillator (IF) having a continuously adjustable, actual frequency range from 2000 to 3000 C. P. S. calibrated "0" to "1000" C. P. S. The standard frequencies 1, 10 and 100 kc. are provided from the harmonic generators, HG-1, HG-10 and HG-100 connected to the respective standard frequency sources SF-1, SF-10 and SF-100 which may be locked-in with a common primary standard. The mid-band frequencies for the first filters ($F_{a-1}$; $F_{a-10}$; $F_{a-100}$) have been arbitrarily chosen as 38 kc. ($f_{a-1}$), 390 kc. ($f_{a-10}$) and 1900 kc. ($f_{a-100}$) respectively. The required standard frequencies ($f_s$) as well as selecting oscillator frequencies associated with the particular decade switch positions, are shown in Table 1 below.

*Table 1*

3 decade system: 200 to 1000 kc. range.
Interpolating oscillator range: 2000 to 3000 C. P. S.
First filter mid-band frequencies: $f_{Fa-1}$=38 kc.; $f_{Fa-10}$=390 kc.; $f_{Fa-100}$=1900 kc.
Frequencies in kc.

| Decade Switch Step | First Decade (Units) | | Intermed. Decade (Tens) | | Last Decade (Hundreds) | |
|---|---|---|---|---|---|---|
| | $f_{so-1}$ | $nf_{s-1}$ | $f_{so-10}$ | $nf_{s-10}$ | $f_{so-100}$ | $nf_{s-100}$ |
| 0 | 30 | 8 | 300 | 90 | ------- | ------- |
| 1 | 29 | 9 | 290 | 100 | ------- | ------- |
| 2 | 28 | 10 | 280 | 110 | 1,800 | 100 |
| 3 | 27 | 11 | 270 | 120 | 1,700 | 200 |
| 4 | 26 | 12 | 260 | 130 | 1,600 | 300 |
| 5 | 25 | 13 | 250 | 140 | 1,500 | 400 |
| 6 | 24 | 14 | 240 | 150 | 1,400 | 500 |
| 7 | 23 | 15 | 230 | 160 | 1,300 | 600 |
| 8 | 22 | 16 | 220 | 170 | 1,200 | 700 |
| 9 | 21 | 17 | 210 | 180 | 1,100 | 800 |

In the above table:
$f_{so}$—selecting oscillator frequencies
$nf_s$—standard frequency selected harmonics It should be noted that at any particular step:

$$f_{so}+nf_s=\text{ const }=f_a \text{ (see Equation 2)}$$

To explain the operation of the proposed system, let it be assumed that the desired frequency is 728,586 C. P. S.

The 100 kc. decade switch DS-100 is set in position 7, the 10 kc. decade switch DS-10 is set in position 2 and the 1 kc. decade switch DS-1 is set in position 8 as required by the first three digits of the desired frequency. The interpolating oscillator dial 2 is set on "586" C. P. S. nominally, but its actual frequency in this case is 2,586 C. P. S. as explained above.

From Table 1 we find that for these settings the following frequencies will be provided from the selecting oscillators:

$f_{s1-100}$ (step#7)$=1300\pm df_{100}$ kc.
$f_{so-10}$ (step#2)$=280\pm df_{10}$ kc.
$f_{so-1}$ (step#8)$=22\pm df_1$ kc.

where:

$df$ signifies the instantaneous values of the extraneous deviations present in the selecting oscillators.

These selecting oscillator frequencies will be mixed in the first modulators ($M_{a-1}$; $M_{a-10}$ and $M_{a-100}$, respectively) with the output frequencies from the associated harmonic generators. As has been explained, some of these harmonics will complement the selecting oscillator frequencies in such a way that the sum will be equal to the mid-band frequencies of the first filters ($F_{a-1}$, $F_{a-10}$, $F_{a-100}$), respectively. The following frequencies therefore will be supplied to inputs of the second modulators ($M_{b-1}$; $M_{b-10}$; $M_{b-100}$).

At $M_{b-100}$: $1300\pm df_{100}+600=1900\pm df_{100}$ kc.
At $M_{b-10}$: $280\pm df_{10}+110=390\pm df_{10}$ kc.
At $M_{b-1}$: $22\pm df_1+16=38\pm df_1$ kc.

in which 600, 110 and 16 are the 6th, 11th and 16th harmonics of the frequencies SF-100, SF-10 and SF-1 respectively. The frequency of 2,586 C. P. S., coming from the interpolating oscillator (IF), is mixed in the second modulator (*Mb*-1) with the frequency ($f_{a-1}$) of $38\pm df_1$ kc. Assuming, for simplicity, a balanced modulator (although this is not essential), the following frequencies of the most significant amplitudes will be present at the second modulator (*b*-1) output:

(*a*) $38\pm df\text{-}1$ kc.
(*b*) $38\pm df\text{-}1+2.586=40.586\pm df\text{-}1$ kc.
(*c*) $38\pm df\text{-}1-2.586=35.414\pm df\text{-}1$ kc.

Since the second modulator ($Mb$–1) is connected to the high pass filter $Fb$–1 with a cut-off frequency ($fb1_{(co)}$) equal to 40–$df_{max}$ kc. (see Equation 5), only the frequency of 40.586±$df$–1 kc., will pass the second filter $Fb$–1 to the input of the third modulator $Mc$–1 with the frequency 22±$df$–1 kc., its output will include the following significant frequencies:

($a$) (40.586±$df_1$) kc.
($b$) (40.586±$df_1$)+(22±$df_1$)=(62.586±2$df_1$) kc.
($c$) (40.586±$df_1$)−(22±$df_1$)=(18.586±0) kc.

Of these three frequencies, only the last will pass through the low-pass filter Fc1 with its cut-off frequency at 20 kc. In this was only the frequency equal to the sum of the selected standard frequency harmonic (16 kc.) and the interpolating oscillator frequency (2.586 kc.) passes to the next decade chain and this frequency will be free of selecting oscillator frequency fluctuations.

The operation of the second decade chain is similar to operation of the first just described. It will be seen that in the case under consideration (for frequency setting of 728,586 C. P. S.), the standard frequency harmonic of 110 kc. (see Table 1, step 2), from the harmonic generator (HG–10), will be added eventually in this chain to 18,586 C. P. S. supplied from the first chain to modulator $Mb$–10 as the interpolation frequency for the second decade. Similarly in the third decade chain, the sum of 128,586 C. P. S. will be added to the standard frequency harmonic of 600 kc. (see Table 1, step 7), providing eventually, at the output terminal of the filter $Fc$–100, the desired frequency of 728,586 C. P. S., corresponding to the setting of the decade switches and of the interpolating oscillator. It can be shown that the system operates in a similar manner for any other frequency setting within the operation range of 200 kc. to 1000 kc.

While the system of Fig. 2 just described has continuous adjustability over its specified range, it will be noted that the lower limit of the range, 200 kc., is the frequency of the second position of the switch DS–100 of the highest decade. It is possible, of course, to obtain 100 kc. directly from the second decade but no further extension of the range toward lower frequencies can be obtained in such a simple manner.

The actual output frequencies from the interpolating oscillator and from the single decade chains are:

Interpolating oscillator from 2,000 to 2,999 C. P. S.
First decade chain ($Fc$–1 output)—from 10,000 to 19,999 C. P. S.
Second decade chain ($Fc$–10 output)—from 100,000 to 199,999 C. P. S.
Third decade chain ($Fc$–100 output)—from 200,00 to 999,999 C. P. S.

From the above it is apparent that there are still two frequency range gaps, namely 3000 to 9999 C. P. S. and 20,000 to 99,999 C. P. S. Similarly it will be found that any system of the general type of Fig. 2 has only a limited range of continuous frequency adjustability as stated above. The principal reason for this is that the frequency contribution from any intermediate decade to the final frequency cannot be made zero. Moreover, no component frequency in any combining operation can be less than a certain minimum value determined by various factors such as the selectivity of filters.

It also can be shown that, in general, a decade frequency setting system of continuous frequency adjustability over a wide band cannot be realized in practice by assigning to each decade output frequencies which are independent of the settings of the higher decades. In other words, when the desired frequency range extends below the first step of the highest decade, it is necessary in some instances to determine the output frequencies of certain decades according to the selected positions of the higher decade controls. The principles underlying the design of these combined controls will now be explained.

In the following discussion the term "range starting decade" is the decade in which the frequency at the second or higher step is the lower limit of the desired frequency range. This is not necessarily the lowest decimal decade for in the system of Fig. 2, for example, the range starting decade is the highest decade, which has steps of 100 kc. The term "main decades" includes the range starting and all higher decades. The term "interpolation frequency source" is merely the interpolation oscillator in cases where the lowest decade is also the range starting decade. The standard frequency signals provided at the various steps within a decade are referred to as "decade contributing frequencies" and these are combined with frequencies from the interpolating frequency source to provide the "decade output frequencies."

To obtain continuous frequency adjustability each main decade, except the highest, must have more than ten frequencies assigned to the ten positions of its decade switch. It can be shown that the number L required in the general case is $$L=19-P_0 \qquad (14)$$

Where $P_0$ is an integral number and $$P_0=\frac{f_{i(0)}}{f_s} \qquad (15)$$

Where $f_s$ is the decade step of the range starting decade and, for this decade only $f_i(0)=f_{ro}-f_s$ where $f_{ro}$ is the lower limit of the desired frequency range.

For all other decades, $f_i(0)$ is the interpolating frequency for the particular decade when all the lower decades and the interpolating oscillator are set in their zero positions.

These frequencies (L in number) form a progressive series of values, each higher than the preceding by the value of the standard frequency step ($f_s$). The lowest value in the series is equal to one decade step ($f_s$) of the decade under consideration and the highest value is equal to $(19-p_0)f_s$ (see Equation 14). This series can be presented, therefore, in the following manner:

$$1f_s,\ 2f_s,\ 3f_s\ .\ .\ .\ (9-p_0)f_s\ .\ .\ .\ (18-p_0)f_s$$

and $$(19-p_0)f_s$$

This series of frequencies is divided into two groups:

(1) The "low" decade frequency group contains the first $(9-p_0)$ frequencies from the above series. The lowest frequency value is assigned to the particular decade step, in the decade step order: 0, 1, 2, 3, 4, 5, 6, 7, 8, 9 which is equal to $(p_0+1)$.

(2) The "high" decade frequency group contains the ten remaining frequencies starting with $(10-p_0)f_s$ at decade step "0" and continuing up to $(19-p_0)f_s$ at decade step "9."

An illustration of a typical intermediate decade, for which the "$p_0$" value is assumed to be equal to "1" is shown below:

*Table 2*

Decade contributing frequencies ($p_0$=1).

| Decade Step | "Low" Fr.-cy. Group | "High" Fr.-cy. Group |
|---|---|---|
| 0 | | $9f_s$ |
| 1 | | $10f_s$ |
| 2 | $1f_s$ | $11f_s$ |
| 3 | $2f_s$ | $12f_s$ |
| 4 | $3f_s$ | $13f_s$ |
| 5 | $4f_s$ | $14f_s$ |
| 6 | $5f_s$ | $15f_s$ |
| 7 | $6f_s$ | $16f_s$ |
| 8 | $7f_s$ | $17f_s$ |
| 9 | $8f_s$ | $18f_s$ |

From the above explanation and Table 2 it is evident that to every decade step of numerical value higher than "$p_0$" there are two different decade frequency values assigned, and that the frequencies of the "high" group differ from the frequencies of the "low" group assigned to the same step by the value of 10 decade steps ($10f_s$). It should be noted that this applies not only to the decade contributing frequencies, but also to the "decade output frequencies" as well, the only difference being that, as explained above, the latter differ from the former by the interpolating frequency incoming from the preceding decade chain.

The selection of the decade frequencies from the high or low group is governed by the following rules:

(1) If, for a given frequency setting, there is at least one higher decade not being set in position "0," the contributing frequency of the decade under consideration is provided by the "high" decade frequency group.

(2) If, for the given frequency setting, all higher decades are set in "0" positions respectively, the contributing frequency of the decade under consideration is provided by the "low" decade frequency group.

From the above, the following conclusions can be drawn:

(*a*) The "zero" position output frequency from any of the main decades, when all the lower decades and/or the interpolating frequency source are set in position "zero," respectively, is equal to ten standard frequency decade steps of the decade under consideration. For example, in Table 2 the contributing frequency assigned to step "zero" is $(10-p_0)f_s$ but, from Formula 15 $p_0f_s=f_{i(0)}$ where $f_{i(0)}$ is frequency incoming from the lower grade and/or the interpolating oscillator when all of them are set in "zero" positions, respectively. Therefore, on the step "zero" the decade output frequency, being the sum of the "contributing" frequency and of the frequency incoming from the lower decades and/or the interpolating oscillator, will be: $(10-p_0)f_s+f_{i(0)}=10f_s$ (as stated above).

(*b*) The highest decade of the system requires no "high" frequency decade group.

(*c*) There is no frequency contribution from the highest decade in a given frequency setting if the decade under consideration is set in a position the number of which does not exceed the value of integer "$p_0$." This follows from the fact (rule 2) that the "low" frequency group starts at the step $(p_0-1)$, as explained above.

Fig. 3 shows a selecting oscillator SO for the *n*th decade chain of a system based on the above rules. This oscillator has high and low groups of frequency determining elements SN*a* and SN*b* having their selecting arms ganged together for simultaneous operation by the decade switch. The decade switches SN+1, SN+2, etc., of the higher decades have, in addition to the frequency controls not shown for the selecting oscillators of these decades, another set of contacts zero to 9 in each case as shown for determining from which group the frequency determining element for the oscillator of the lower *n*th decade is to be selected. As indicated, the selecting arm of the low group is connected to the oscillator grid through the zero position contacts of all the higher decade switches whereas the selecting arm of the high group is connected in parallel with all the higher decade switches in all other switch positions.

It will be seen that this circuit can provide alternatively "low" or "high" group frequencies, as called for by the above described rules. For instance, when all higher decades are in "zero" position, respectively, the selecting oscillator is tuned to a frequency which provides a "low" group contributing frequency within a given decade chain as required by rule 2. In the alternate case, when at least one of the higher decades is not in "zero" position, the selecting oscillator is tuned to a frequency providing a "high" group frequency within the decade chain under consideration as required by rule 1.

Obviously, the necessary switching can be achieved either directly by conventional selector switches as shown in Fig. 3, or indirectly by a system of relays, operated by decade switch settings.

Figure 4:
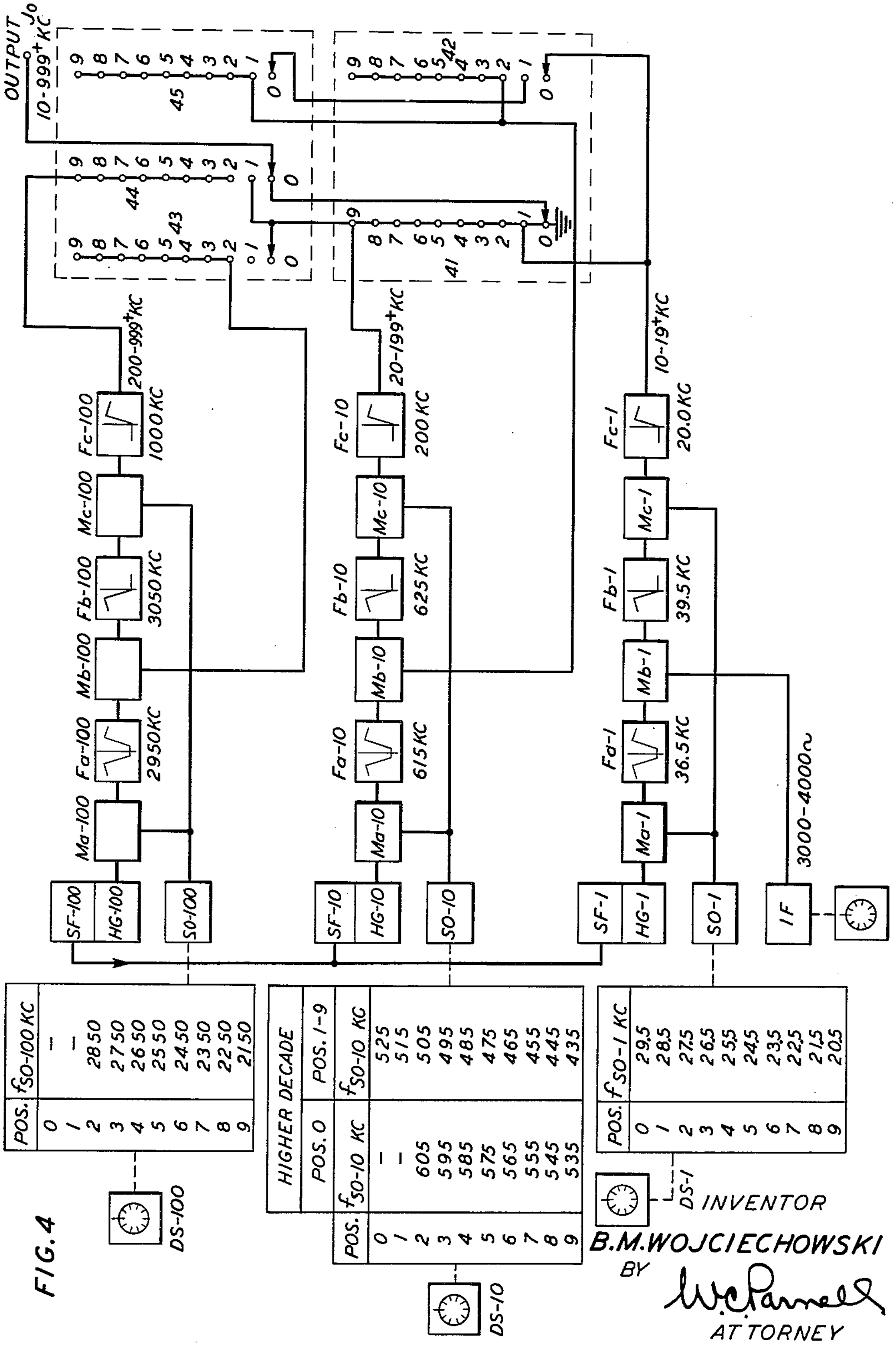
Fig. 4 is a typical three decade system providing continuous frequency adjustment over a wide frequency range.

Fig. 4 shows a system according to the invention with continuous frequency adjustability over the range from 10 kc. to 99+ kc. where + represents the range of the interpolation oscillator IF, in this case 1000 cycles, so that the system range effectively is 10 kc. to 1000 kc. In accordance with the general principles described, only the second decade of this particular system requires high and low frequency groups. Only oscillator SO–10 therefore is provided with two groups of frequency determining elements and interconnections with the 100 kc. decade switch DS–100 such as are shown for the general case in Fig. 3 already described. With selecting oscillator frequencies for the various positions as given in Fig. 4 and with contact banks 41 and 42 ganged with switch DS–10 and contact banks 43, 44 and 45 ganged with switch DS–100, this system operates as follows:

To obtain a signal of 34,758 C. P. S., for example, set the dial of the oscillator IF at the frequency 3758 C. P. S., the switch DS–1 at position 4 to give $f_{so-1}=25{,}500$ C. P. S., the switch DS–10 at position 3 to give $f_{so-10}=595{,}000$ (rule 2) and switch DS–100 at position zero (no output frequency). The 1 kc. decade chain operates in the same general manner as in the previous example to supply in this case a signal of 14,758 C. P. S. through contact bank 42, position 3, to the modulator M*b*–10.

In the 10-kc. decade chain, disregarding in each case the selecting oscillator drift which as already explained does not affect the final frequency, the narrow-bank filter F*a*–10 will pass: (595,000 C. P. S.)+20,000 C. P. S.=615,000 C. P. S., where 20,000 C. P. S. is the 2nd harmonic of the 10–kc. standard frequency signal. The modulator M*b*–10 will receive: 615,000 C. P. S. (from F*a*–10) and 14,750 C. P. S. (from the first decade chain). The main modulation products at M*b*–10 output will be: 629,758 C. P. S., 615,000 C. P. S. and 600,242 C. P. S. The high-pass filter F*b*–10, with a cut-off frequency at 625 kc., essentially will pass only 629,758 C. P. S. The modulator M*c*–10 will receive 629,758 C. P. S. (from F*b*–10) and 595,000 C. P. S. (from SO–10). The main modulation products at M*c*–10 output will be: 1,224,758 C. P. S. 629,758 C. P. S., 595,000 C. P. S. and 34,758 C. P. S. The low-pass filter F*c*–10, with cut-off frequency at 200.0 kc., essentially will pass only 34,758 C. P. S. The output signal of this frequency, corresponding to the initial decade frequency setting, is conducted to the output jack J*o* through the switch DS–10, contact bank 41 (position 3) and the zero position of bank 44 of switch DS–100.

To obtain a signal of 634,758 C. P. S., the oscillator IF and decade switches DS–1 and DS–10 are left in the positions used in previous example, switch DS–100 is moved to position 6 to give $f_{so-100}=2450$ kc. The frequency $f_{if}$ will be 3758 C. P. S. and the frequency $f_{so-1}$ will be 25,500 C. P. S. both as before but, in accordance with rule 1, $f_{so-10}$ now is 495,000 C. P. S. as determined by the setting of switch DS–100, contacts SN+1 of Fig. 3.

The 1 kc. chain supplies 14,758 C. P. S. to modulator M*c*–10 as before. In the 10 kc. chain the narrow-band filter F*a*–10 will pass 495,000 C. P. S. (from F*b*–10)+120,000 C. P. S. (12th harmonic)=615,000 C. P. S. The modulator M*b*–10 will receive 615,000 C. P. S. and 14,758 C. P. S. (from the first decade chain). The main modulation products at M*b*–10 output will be 629,758 C. P. S., 615,000 C. P. S., and 600,242 C. P. S. all as before. The high-pass filter F*b*–10, as before, will pass only 629,758 C. P. S. The modulator M*c*–10 will receive 629,758 C. P. S. and 495,000 C. P. S. The main modulation products at M*c*–10 output will be 1,124,758 C. P. S., 629,758 C. P. S., 459,000 C. P. S. and 134,758 C. P. S. The low-pass filter F*c*–10, with cut off frequency at 200.0 kc., essentially will pass only 134,758 C. P. S. This output signal from the second chain is conducted through the 100-kc. decade switch, DS–100, bank 43, position 6 to the modulator Mb–100.

In the 100-kc. decade chain, the narrow-band filter Fa–100 will pass: 2,450,000 C. P. S.+500,000 C. P. S.=2,950,000 C. P. S. where 500,000 C. P. S. is the 5th harmonic of the 100-kc. standard frequency signal. The modulator Mb–100 will receive: 2,950,000 C. P. S. from Fb–100 and 134,758 C. P. S. from the second decade chain. The main modulation products at Mb–100 output will be: 3,084,758 C. P. S., 3,950,000 C. P. S. and 2,815,242 C. P. S. The high-pass filter Fb–100, with cut-off frequency of 3050 kc., essentially will pass only 3,084,758 C. P. S. The modulator Mc–100 will receive 3,084,758 C. P. S. from Fb–100 and 2,450,000 from SO–100. The main modulation products at Mc–100 output will be 5,534,758 C. P. S., 3,084,758 C. P. S., 2,450,000 C. P. S. and 634,758 C. P. S. The low-pass filter Fc–100, with cut-off frequency at 1000 kc., essentially will pass only 634,758 C. P. S. The output signal of this frequency, corresponding to the initial decade frequency setting, is conducted to the output jack Jo through the 100-kc. decade switch DS–100, bank 44, position 6.

Figure 5:
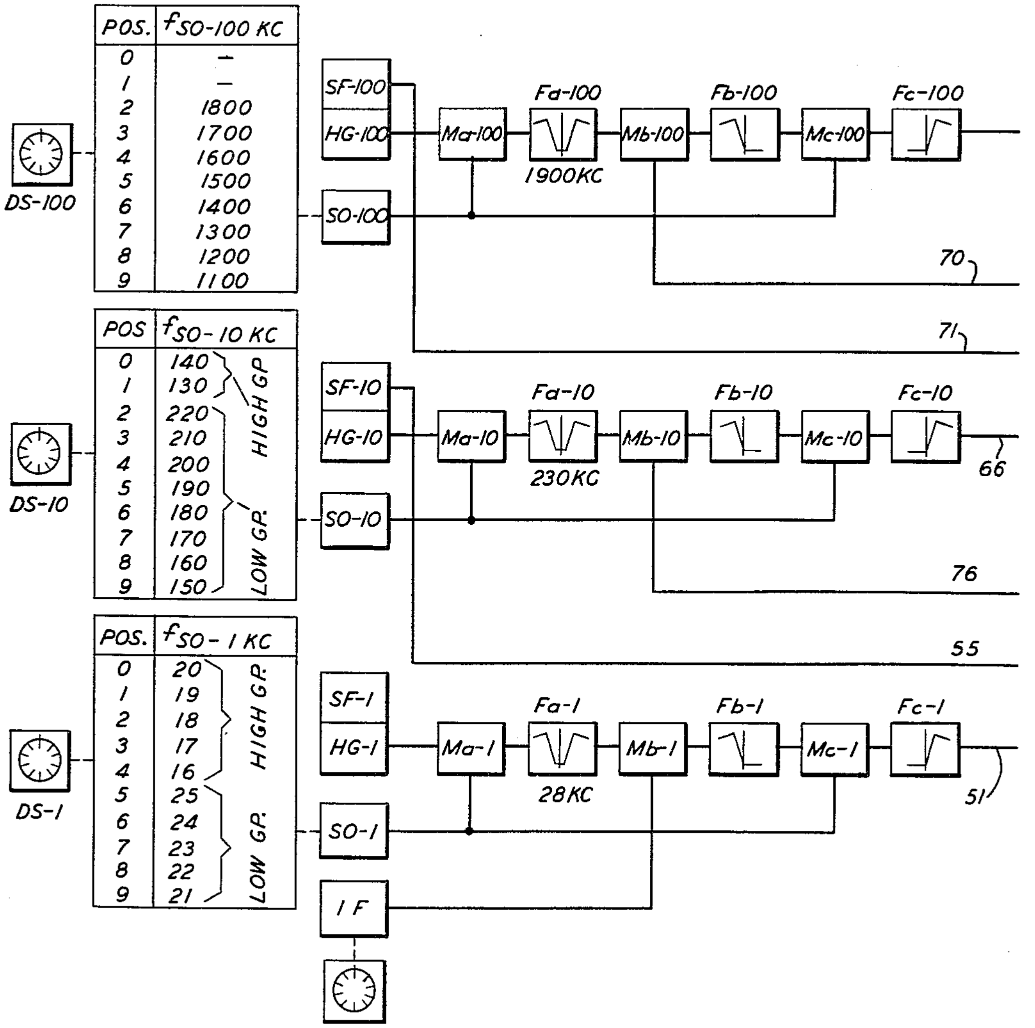
Figs. 5 and 5A show another wide range system with alternative means for obtaining continuous frequency adjustability.
Figure 5A:
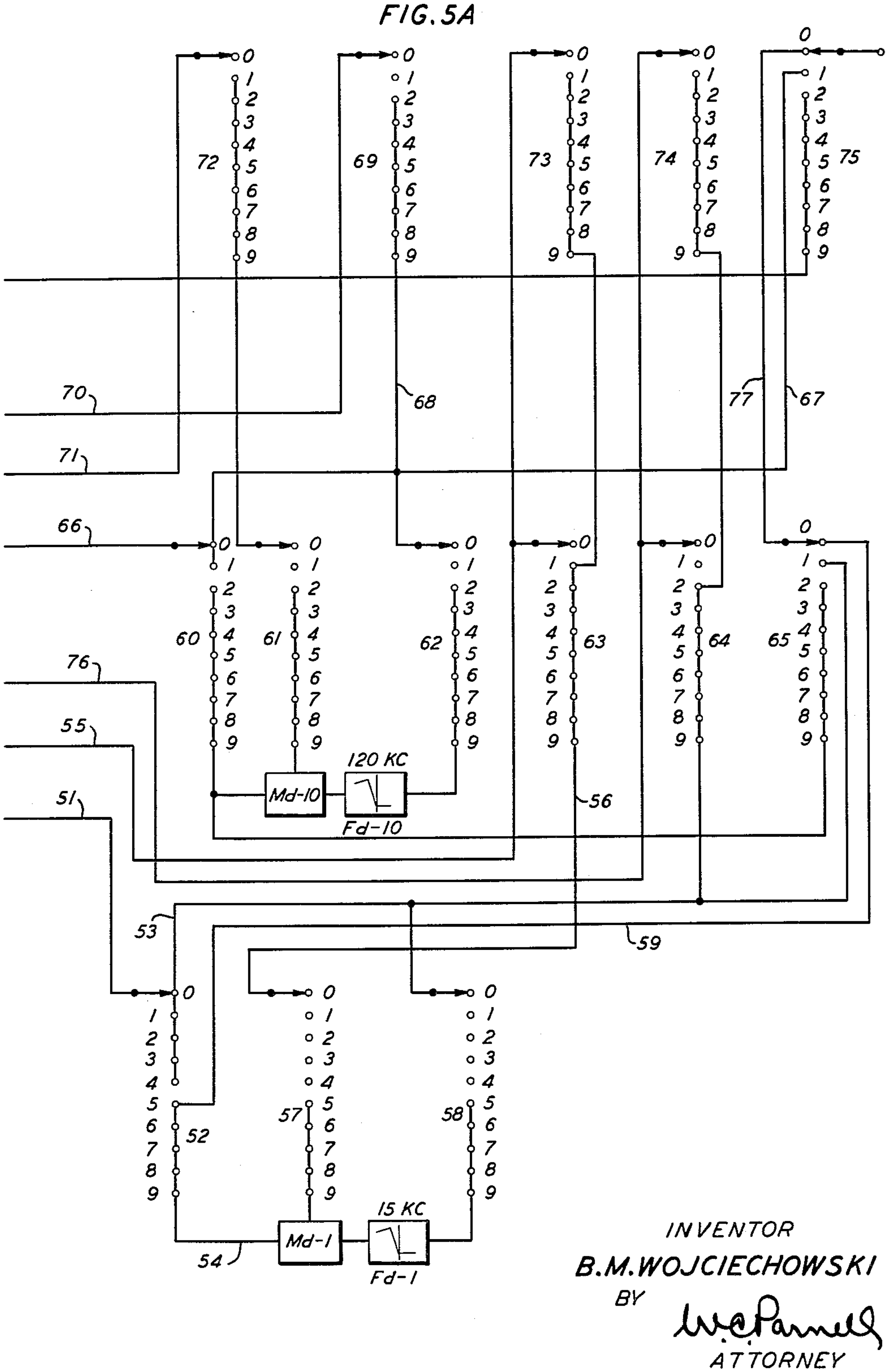

Another method of providing the required decade chain frequencies is shown in Figs. 5 and 5A. In this case advantage is taken of the fact that there is a fixed frequency difference of 10 decade steps between the frequencies of the high group and those of the low group assigned to the same decade steps. It also should be noted that to the steps having numerical values equal to or lower than $P_0$ of Equation 12 only single high group frequencies are assigned.

A set of ten frequencies therefore may be assigned to the respective decade switch positions and any additional high group frequencies required may be obtained by adding to the decade output a frequency equal to ten decade steps or one step of the next higher decade. This is accomplished in the system of Fig. 5 by adding to each chain, except the highest, an additional modulator Md and filter Fd as shown.

In the lowest decade the added modulator Md–1 has in its output a high-pass filter Fd–1 with a cutoff at 15-kc. and three additional banks of contacts operated by the decade switch Ds–1 are provided for connecting in or by-passing this added modulator as required in accordance with the rules given above for selecting frequencies from the low or the high group. For the case illustrated, covering the range 5–999+ kc., with the switch DS–1 in positions 0 to 4, the decade output frequencies from the first decade chain, have two alternate routes both by-passing modulator Md–1 and filter Fd–1. For desired output frequencies between 10 and 14+ kc., they pass from filter Fc–1 over conductor 51; contact bank 52 of DS–1; conductor 53; contact bank 65 of DS–10 pos. 1; conductor 77; contact bank 75 of DS–100 pos. 0 to the output jack Jo. For any other frequency settings involving positions 0 to 4 of switch DS–1 positions, they pass from filter Fc–1 over conductor 51; contact bank 52, conductor 53, contact bank 64 of DS–10 (and in some settings contact bank 74 of DS–100), conductor 76 to the modulator Mb–10.

For frequency settings of 5 to 9+ kc., also modulator Md–1 and filter Fd–1 are by-passed, the output from the first decade chain being transmitted directly to the output jack Jo over the following circuit, from filter Fc–1 over conductor 51, contact bank 52 (contacts 5–9), conductor 59; contact bank 65 (contact 0), conductor 77, contact bank 75 (contact 0) to the output jack.

For any other frequency settings, involving positions 5–9 of the decade switch DS–1, the output from the filter Fc–1 is transmitted over conductor 51; contact bank 52, contacts 5–9, modulator Md–1; filter Fd–1; contact bank 58, contacts 5–9, conductor 53; contact bank 64 (and in some settings contact bank 74), conductor 76, to the modulator Mb–10. At the same time, the 10-kc. signal also is transmitted to the modulator Md–1 from SF–10 over conductor 55, through contact bank 63, or 73, or both (contacts 1–9), to conductor 56, contact bank 57 (contacts 5–9), to modulator Md–1.

In this case, therefore, the output frequency from the 1-kc. chain is increased by 10-kc., through the additional modulating and filtering process, as described above.

Similarly, the second decade has a modulator Md–10 and filter Fd–10 together with contact banks 60 to 65 all operated by a decade switch Ds–10 for by-passing the modulator Md–10 or adding it to the decade chain as required and for making proper interdecade connections in accordance with the principles explained above. In positions zero and one of Ds–10 the chain output from filter Fc–10 passes over conductor 66 to contact bank 60 and then over conductor 67 to the output jack or over conductor 68, contact bank 69 and conductor 70 to modulator Mb–100 to provide interpolating frequency in the highest decade. In positions 2 to 9 of Ds–10, the second decade output passes to the modulator Md–10 which then receives 100-kc. frequency from oscillator Sf–100 over conductor 71 and contact banks 72 and 61. The sum modulation product which is the normal output of the second decade plus 100–kc. then passes to the output or to modulator Mb–100 according to the setting of the Ds–100 decade switch. In either case the 100-kc. decade operates in the general manner previously described so that as in the other systems any frequency within the range (in this case 5 kc. to 1000 kc.) may be obtained at the output jack merely by setting the interpolation oscillator and the decade switches.

Oscillator systems, according to this invention, have been found to have a number of advantages over the best systems previously available. While the systems are electrically complex, the operations required to produce any frequency are very simple. This simplicity of operation saves a great deal of time, particularly in production testing, over prior practices which involve the use of complex calibration charts and laborious interpolation methods or switching procedures or both. The output frequencies are inherently stable, they correspond accurately to the settings and they are free to an unusual degree of harmonics and modulation product distortion. Since oscillator systems according to this invention, can be adjusted in a straightforward manner, they can be readily used to provide in succession any required series of frequencies under the control of automatically operated means, such as a tape having code perforations for controlling stepping mechanism which index the decade switches.

All of the foregoing examples are based on decade systems, that is, those in which the standard frequencies of the several chains are related to each other on a decimal basis. It should be noted, however, that the principles of the invention are of general application and may be used in designing oscillator systems derived, for example, from binary or ternary systems.

It will be understood therefore that the decade systems shown and the particular examples given are merely illustrative applications of the general principles of the invention. In accordance with these principles various other systems may be readily devised within the spirit and scope of the invention.

What is claimed is:

1. A frequency generating system comprising at least one chain consisting of three modulators each having two input and an output circuits, two fixed frequency selective elements, one interposed between the output of the first modulator and one input of the second modulator, the other interposed between the output of the second modulator and one input of the third modulator, an alternating current source of harmonically related frequencies connected to one input of the first modulator, a second alternating current source of multiple frequencies differing from each other by a substantially constant frequency interval connected to the other input circuits of the first and the third modulators for applying thereto any one of the multiple frequencies, a third alternating current source of frequencies adjustable over said frequency interval connected to the other input of the second modulator and a third fixed frequency selective element connected to the output of the third modulator for selecting a desired modulation product and for eliminating from the output of the third frequency selective element the frequency drift component of the second alternating current source.

2. Frequency generating apparatus according to claim 1 in which the first frequency selective element has a narrow pass band for transmitting only the essentially constant frequency modulation product representing the sum of any one of the multiple frequencies and different ones of the harmonically related frequencies and in which the third frequency selective element is of a type for passing only the difference frequencies in the output of the third modulator.

3. Frequency generating apparatus according to claim 1 in which all of the said multiple frequencies are lower than any of the harmonically related frequencies, the first frequency selective element transmits only the essentially constant-frequency modulation product representing the difference of any one of the multiple frequencies and different ones of the harmonically related frequencies and the third frequency selective element is of a type for passing only the sum frequencies in the output of the third modulator.

4. Frequency generating apparatus according to claim 1 in which all of the said multiple frequencies are higher than any of the harmonically related frequencies, the first frequency selective element transmits only the essentially constant-frequency modulation product representing the difference of any one of the multiple frequencies and different ones of the harmonically related frequencies and the third frequency selective element is of a type for passing only the difference frequencies in the output of the third modulator.

5. A frequency generating chain comprising three modulators each having two input and an output circuits, a fixed filter connected between the output of the first modulator and an input of the second modulator, a second fixed filter connected between the output of the second modulator and an input of the third modulator and a third fixed filter connected to the output of the third modulator, a source of harmonics of an accurate standard frequency connected to one of the inputs of the first modulator, a second source of multiple, substantially constant frequencies differing from each other by a substantially constant frequency interval numerically equal to the standard frequency connected to the other input of the first modulator and to the other input of the third modulator and a source of interpolation frequency adjustable over a frequency range equal to said frequency interval connected to the other input of the second modulator.

6. A frequency generating system comprising a plurality of chains according to claim 5 in which the frequency intervals between the multiple frequencies in the successive chains are of successively higher decimal orders and the output of each chain is the source of interpolation frequency for the next higher chain.

7. A system for generating, selecting and combining frequencies to produce any single frequency in a wide range comprising a plurality of decade chains each having input and output circuits, a source of standard frequency, means for supplying to each chain harmonics of the standard frequency of progressively higher decimal orders, a second source for each chain for generating and applying to the chain any one of multiple frequencies all differing from each other by a frequency interval substantially equal to the decimal order of the chain, means in each chain for selecting any one of the multiple frequencies of the second source, a stable source of adjustable interpolation frequency for the lowest order chain, modulators in each chain for combining the frequencies applied to the chain, filters for selecting desired modulation products and a circuit from the output of each chain to a modulator in the next higher decade chain for supplying interpolation frequencies to the higher chains.

8. A system for generating, selecting and combining frequencies to produce any desired frequency in a wide range comprising a plurality of successive decade chains for generating components of the desired frequency, interconnections between the chains for successively supplying the generated components to the successive chains, means in each chain for selecting the frequencies to be generated in the chain and circuits established by the setting of the selecting means of at least one of the chains for determining the frequency generated by a preceding decade.

9. A system for generating, selecting and combining frequencies to produce any desired frequency in a wide range comprising a plurality of decade chains for generating components of the desired frequency, interconnections between the chains for successively supplying the generated components to the higher chains, an oscillator in each chain having a first group of frequency determining elements and switching means for selectively connecting the elements to the oscillator, a second group of frequency determining elements for the oscillator of at least one chain ganged with the oscillator switching means and contacts operated by the switching means of another chain for selectively connecting either of the two groups of elements to the oscillator of said one chain.

10. A system for generating, selecting and combining frequencies to produce any desired frequency in a wide range comprising a plurality of decade chains for generating components of the desired frequency, interconnections between the chains for successively supplying the generated components to the higher chains, an oscillator in each chain having a first group of frequency determining elements and switching means for selectively connecting the elements to the oscillator, a modulator and filter for at least one of the lower order chains and contacts operated in certain positions of the switching means of a higher order chain for connecting the modulator and filter serially in the inter-connections between the lower and higher order chains.

11. A system, according to claim 7, in which the second frequency source in one of the chains is provided with means for generating at least two ranges of multiple frequencies and in which the setting of the adjusting means for the second source in a higher chain selects the range of multiple frequencies to be generated by the operation of the adjusting means of said one chain.

12. A system, according to claim 7, having means in one of the chains for shifting the range of the multiple frequencies generated by the second frequency source to change the output range of said one chain.

References Cited in the file of this patent

UNITED STATES PATENTS 2,231,634 Monk ---------------- Feb. 11, 1941